United States Patent [19]

Opprecht et al.

[11] Patent Number: 4,572,937
[45] Date of Patent: Feb. 25, 1986

[54] METHOD OF ELECTRICAL RESISTANCE ROLL SEAM WELDING WITH ONLY ONE ELECTRODE WIRE, MACHINE FOR PERFORMING THE PROCESS AND USE OF THE PROCESS

[75] Inventors: Paul Opprecht, Bergdietikon, Switzerland; Wolfgang Weil, Heitersheim, Fed. Rep. of Germany

[73] Assignee: Soudronic AG, Bergdietikon, Switzerland

[21] Appl. No.: 651,812

[22] Filed: Sep. 18, 1984

[30] Foreign Application Priority Data

Sep. 20, 1983 [CH] Switzerland ............... 5117/83

[51] Int. Cl.⁴ ............................................. B23K 11/06
[52] U.S. Cl. ........................................... 219/83; 219/81
[58] Field of Search ................................... 219/81–84

[56] References Cited

U.S. PATENT DOCUMENTS

| 3,504,155 | 3/1970 | Opprecht et al. | 219/81 |
| 3,842,235 | 10/1974 | Opprecht | 219/83 |
| 4,137,444 | 1/1979 | Schalch | 219/81 |
| 4,258,245 | 3/1981 | Flaherty | 219/81 |
| 4,476,371 | 10/1984 | Schreiber | 219/83 |

FOREIGN PATENT DOCUMENTS 1124888 8/1968 United Kingdom .

Primary Examiner—C. L. Albritton
Assistant Examiner—Catherine Sigda
Attorney, Agent, or Firm—McCormick, Paulding & Huber

[57] ABSTRACT

A welding machine with wire electrodes is used to electrically resistance roll seam weld tin plate. Only one electrode wire running over both of the electrode carrying rolls is used. To prevent the formation of a loop in the wire stretch between the electrode carrying rolls a hard wire is required which is produced by a prior rolling of a soft round wire. With this rolling there results however a non-uniform hardness distribution over the wire cross section with areas of high and areas of low material hardness so that the average strength increase over the entire wire cross section of the electrode wire remains below the increase in strength which could theoretically be reached if no portion of the wire cross section remained outside of the area of high material strength. A closer approach to this theoretical increase in strength is achieved instead of rolling, by cold forming in several steps, in which cold forming the round wire is in a first forming stage cold formed to smaller diameter by drawing and thereafter in a second forming stage is cold formed by flat rolling. This brings advantages to the welding process as well as substantial savings in wire.

28 Claims, 10 Drawing Figures

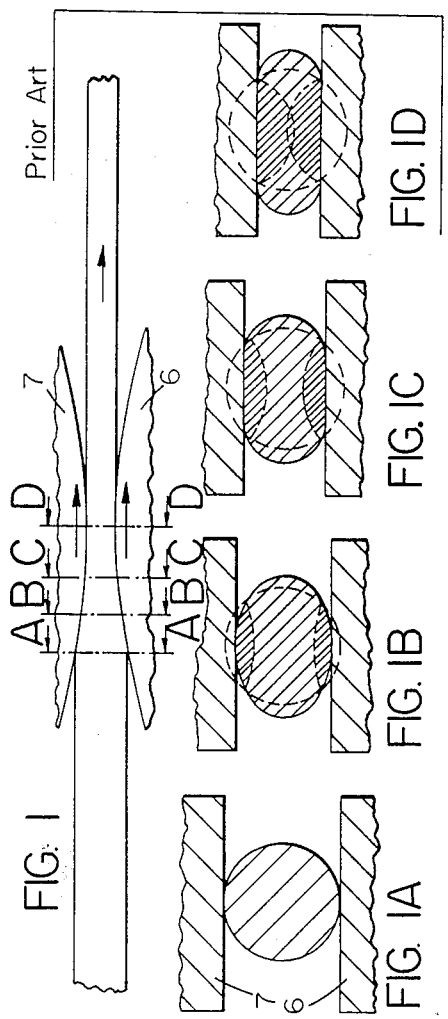
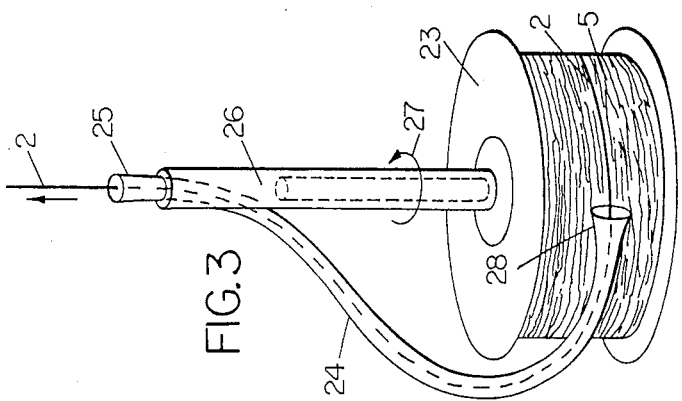
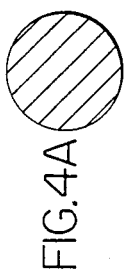
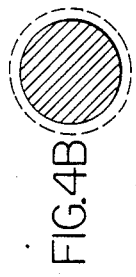

METHOD OF ELECTRICAL RESISTANCE ROLL SEAM WELDING WITH ONLY ONE ELECTRODE WIRE, MACHINE FOR PERFORMING THE PROCESS AND USE OF THE PROCESS

The invention concerns a method for electric resistance roll seam welding with the help of only one electrode wire, which wire is pulled from a supply and runs into a resistance roll seam welding machine first over a first and then over a second of two electrode supporting rolls pressable toward one another, which wire has its strength increased before its arrival at the first electrode supporting roll by cold forming to prevent the formation of wire loops between the two electrode supporting rolls, and which wire before its arrival at the first electrode supporting roll has its cross sectional area reduced and has its cross section converted from an essentially round form to a flat form with a width larger than and a height less than the diameter of the round wire, as well as a welding machine for carrying out this process and a special use or a special application of this method.

A method of this basic type is for example, known from CH-PS No. 536163 and DE-PS No. 2126497. With such method for the first time a continuous resistance roll seam welding with the help of only one electrode wire was made possible and with it the basis for making a high speed automatic welding machine with only one electrode wire. Indeed in principle it is known that by the cold forming of the electrode wire before its arrival at the first electrode carrying roll and by the accompanying strengthening of the electrode wire, the loop which appears in the stretch of electrode wire between the two electrode supporting rolls in the previous methods for resistance roll seam welding with the help of only one electrode wire, as for example, the process known from DE-OS No. 1565803, which loop appears as a result of the rolling of the electrode wire under the pressure of the first electrode carrying roll, is inhibited and as a result of this the necessity still existing with the method according to DE-OS No. 1565803 of interrupting the welding process after short welding periods to pull out the loop formed in the mentioned wire loop was avoided.

The mentioned cold forming can according to CH-PS No. 536163 (column 1, line 41) result either from rolling or drawing, with in each case technical welding fundamentals requiring the cold formed electrode wire to have a large flat surface for engaging the welded goods. From this follows the requirement of the previously mentioned flat cross sectional shape of the cold formed electrode wire (CH-PS No. 536163, column 2, lines 39 to 43). These requirements serve not only for cold forming by means of rolls which necessarily produces a flattening of the wire as a result of the rolling, but also for cold forming by means of drawing (CH-PS No. 536163, column 2, lines 5 to 10). But the drawing of a round wire into a flat cross section has considerable difficulties associated with it which are fundamental in the nature of a drawing process. For if a wire is drawn from another one, then as the elastic limit is exceeded a necking of the wire gradually takes place, and in the case of a round wire, this necking is rotationally symmetric about the wire axis. That is, each transverse section through the wire in the region of the necking is circular and has a smaller diameter than the wire outside of the necking region. In the case of drawing processes using a drawing die, in principle the necking of a wire loaded above its elastic limit is used to reduce the diameter of the wire in that a drawing die is employed having a die opening the inner wall of which is shaped to about the envelope surface of the natural necking corresponding to that associated with the desired diameter reduction, and the wire is pulled through this die opening whereby the effect is that the natural necking can appear at each point of the loaded wire. Since the drawing of wire with the help of drawing dies rests on the natural necking of a wire loaded above its elastic limit and accordingly can only reduce the outer tolerance of a wire, in the case of drawing a round wire into a flat cross section the wire diameter must be one which is larger than the largest external dimension of the flat cross section (in contrast to rolling a round wire into a flat cross section, in which case the largest outer measurement of the rolled wire is larger than the diameter of the round wire), and this necessity of the wire to be drawn having a larger diameter than the outer dimension of the flat cross section to be produced leads in every case, except when only a relatively slight flattening is involved, to the fact that a relatively large portion of the wire cross section of the round wire has to be "drawn away" to arrive at the flat cross sectional shape of the wire, and from this the result is that the drawing of a round wire into a flat cross sectional shape is practically impossible where a large degree of flattening is involved because, as is known, the permissible percentage of cross sectional reduction for each drawing step is limited if the danger of a rupture of the wire in the drawing process is to be substantially avoided. One can deal with this difficulty connected with the limited percentage cross section reduction per drawing step by bringing the round wire to a flat cross section representing a large degree of flattening in several sequential drawing steps each with a relatively small percentage flattening, but with this there are other difficulties. In the first place, considering use of the drawn wire as an electrode wire a problem is that in a drawing process having several sequential drawing steps, because of the indispensable lubrication of the wire, an oil containing lubricant film builds up on the wire which prevents the achievement of an acceptable electrode wire to workpiece resistance for the welding process, and in the case of a drawing process with several sequential drawing steps without lubricant the danger of a rupture of the wire can no longer be excluded. Moreover another problem is that in the case of the individual drawing steps a shaping of the wire departing from natural necking must be forced, which in connection with the hardening of the wire in each drawing step considerably increases the danger of a rupture of the wire. These problems are ones which can theoretically be overcome. The lubrication problem can be overcome by using a lubricant and after the wire is converted into the desired flat cross sectional shape conducting it through a cleaning station for removing the residual lubricant. The hardening problem can be solved by annealing the wire between sequential drawing steps. It is questionable, however, whether such a cleaning station and annealing station is realizable inside of a welding machine, quite apart from the fact that the main purpose of the drawing is not the achievement of a flat cross sectional shape but much more is the strengthening of the wire, and annealing counteracts such strengthening.

For the above reasons it is practically impossible in drawing a round wire into a flat cross section to avoid the danger of wire breaks, if the main purpose of the drawing, as in the case of the process according to CH-PS No. 536163, is the strenghtening of the wire and involves more than a relatively slight flattening of the wire, and since the danger of wire breaks in the case of welding machines working with wire electrodes is economically unacceptable because of the associated production deficiencies and also for many other reasons, the possibility presented in CH-PS No. 536163 of strenghtening wire by drawing to a flattened shape (for example to an elliptical cross sectional shape, as is shown in FIG. 1B) is limited to a relatively slight degree of flattening and to a corresponding modest increase in the strengthening of the wire at the elastic limit. Such an electrode wire made by drawing a round wire to a generally elliptical cross section with a relatively small flattening of the wire (for example, wherein the ratio of the small elliptical axis to the round wire diameter is about 0.9) and a corresponding moderate strengthening is in connection with the method of CH-PS No. 536163 entirely well suited to so called overlap seam welding because in the case of overlap seam welding the sheet edges to be welded together are only welded onto one another and do not need to be pressed against one another as in compression seam welding. Such wire is not suited however for compression seam welding because the required compression of the edges to be welded is possible only with the help of a relatively highly strengthened wire having a correspondingly large flattening (for example, to about a cross sectional shape such as shown in FIG. 1D) and such a large flattening of a round wire is not achievable by drawing itself for the already mentioned reasons especially if the danger of wire breaks is to be practialy avoided.

In contrast to this, the rolling of a round wire with separate drive of the rolls by a motor permits the achievement of a relatively large amount of flattening of the wire and a corresponding large strengthening of the wire without difficulty and especially also without the danger of wire breaks as a result of this cold forming. Also by means of a roll pair with self drive of the rolls between which the wire is pulled, a large flattening of the wire and a corresponding large strengthening of the wire is achievable without taking on a danger of wire breaking as great as in the case of drawing a round wire to a flat cross sectional shape.

From the possibilities for cold forming an electrode wire known from CH-PS No. 536163, it is also within the bounds of the method descriped by this CH-PS that the drawing of the wire is limited to overlapping seam welding, while rolling of the wire in each case can be used not only with overlapping seam welding but also with compression seam welding. Therefore in practice, of the methods described in CH-PS No. 536163 for the cold forming and strengthening of wires, rolling of the wire is exclusively used.

In rolling a soft round wire there results an unequal distribution of the so called micro-hardness over the cross sectional area of the rolled wire. This is due principally to the fact that the soft round wire entering the rolling process, at the moment of its entry, as shown in the section of FIG. 1A, taken through the rolling arrangement of FIG. 1 on the sectional plane A—A, has the roll faces of the two rolls each resting on only one point of the wire, and with further feed of the wire into the rolling arrangement and the beginning of the compression of the wire, as shown in the section of FIG. 1B taken through the roll arrangement of FIG. 1 on the section plane B—B, a high material strengthening is first of all achieved only in the area of the periphery of the wire adjacent the roll faces, because in this peripheral zone the pressure, because of the small surface area of the wire engaging the roll faces, is relatively large while the pressure toward the middle between the two roll surfaces, because of the increasing width of the cross sectional surface of the wire in this direction, becomes smaller as does the material strength. Because of this diminishing material strength from said peripheral zones toward the middle of the wire, the cross section of the wire, as shown in FIG. 1B taken on the sectional plane B—B of FIG. 1, still has an essentially elliptical shape. The further the wire now enters into the roll arrangement and the more it is compressed the further the boundries between the areas of high material strength and the area in the middle of the low material strength shift, as for example shown in the section of FIG. 1C taken on the sectional plane C—C, toward the middle of the wire between the two roll surfaces, which shifting is naturally limited by the degree to which the roll arrangement compresses the round wire. If, for example, the compression of the wire is only relatively slight so that in the sectional plane D—D of the roll arrangement of FIG. 1 only a compression as shown in FIG. 1B is achieved, then the boundry between the areas of high material strength and the area in the middle of low material strength will advance only so far as shown in FIG. 1B by the different crosshatching, and the wire leaving the rolls will therefore have a high material strength only in said peripheral zones, and in its remaining cross sectional area will exhibit a material strength diminishing toward the middle between the two peripheral zones, and it will have a cross section of generally elliptical shape. In case of a large compression of the wire by the rolls, as for example represented in FIG. 1D, the boundries between the areas of high material strength and the area in the middle of low material strength can be so far advanced that the areas of high material strength come together in the middle between the two roll faces, as shown in FIG. 1D and from there on a further strengthening of the wire by still more compression is not achievable. It will therefore be recognized from FIGS. 1B to 1D that with different compressions of the wire different portions of cross section will exhibit a high material strength. However, in each case a not inconsiderable portion of the wire cross section remains outside of the high material strength region, so that over the entire cross section the average strengthening of the wire in each case remains below the strengthening which theoretically could be achieved if no portion of the wire cross section were to remain outside of the high material strength region. Moreover, the same applies for the drawing of a soft round wire into a flat cross sectional shape, because in this case—similarly to the case of rolling—compression of the wire has to occur mainly in the direction to achieve the flat cross sectional shape, and therefore, areas of the wire cross section which remain outside of the region of high material strength also have to be taken into account, but practically this is not of significance because for the reasons explained above drawing a round wire to a flat cross sectional shape, apart from very slight flattenings, does not avoid the danger of wire breaking, and such a danger in the case of welding machines working with wire electrodes is not economically accept- able.

The invention then has as its object to provide a method of the previously mentioned type and a welding machine for carrying out the process, with the help of which one is able to come closer to the previously mentioned theoretically obtainable strengthening and which therefore makes possible a large increase in the strength.

In accordance with the invention, in a method of the previously described type cold forming is carried out in several steps, the electrode wire before its arrival at the first electrode supporting roll being cold formed in a first forming stage by means of drawing and thereafter being further cold formed in a second forming stage by means of rolls. The electrode wire in the first forming stage is essentially equally deformed over its entire cross section and its generally circular cross sectional shape is maintained during the cold forming in the first forming stage. In this first forming stage only the wire diameter is reduced, and this reduction of diameter is of such degree that the predominant portion of the difference (at the elastic limit) between the strength of the wire after the second forming stage and its strength in the annealed state is due to the difference between the wire strength after the first forming stage and its strength in the annealed state. The cross sectional shape of the electrode wire is first converted to a flat one in the second forming stage and the electrode wire is at least so far flattened in this second stage that the precentage widening produced is larger than the percentage lengthening of the electrode wire produced in the same second forming stage.

The invention also has as its basis the recognition that the effect explained above in connection with a rolling process, that with cold forming of a soft round wire to a so called flat wire a not inconsiderable portion of the wire cross section of the flat wire remains outside of high material strengthening, so that if the soft round wire is first of all drawn to a small diameter by a drawing process and then is first rolled flat, since the round wire in the drawing process is uniformly deformed and strengthened over its entire cross section the flat wire produced by the subsequent flat rolling will at the places which remain outside of the region of high material strengthening have a higher strength than in a directly flat rolled wire and accordingly the wire will have an average strength over the total cross section which is significantly larger than with direct flat rolling of the soft round wire.

The main advantage of the subject method lies in the high wire strength at the elastic limit obtainable using the method, as well as in all resulting welding advantages and additionally in significant saving of wire material. The saving of wire material results principally from the mentioned drawing of the round wire to a small diameter in combination with heavy flat rolling made possible by the strengthening of the wire in the drawing process, because the wire in the drawing process is lengthened in accordance with its cross sectional reduction and the required width of the flat wire then can be obtained from the reduced diameter round wire by the heavy flat rolling. An additional advantage is a low height of the flat wire because the resistance formed by the wire between the electrode supporting roll and the welding point and therefore naturally the heat produced by the welding current in the wire is lowered during welding. The high increase of the wire strength at the elastic limit, achievable with the subject invention in comparison to the method of CH-PS No. 536163, results in the following welding advantages: First the high wire strength naturally permits a higher pressure of the electrode supporting rolls and thereby a better compression of the sheet edges to be welded in the case of compression seam welding. Also a safety gap can be maintained between the work point and the elastic limit in the stress-strain diagram of the electrode wire. (The parameters for the involved stress strain diagram are the transverse pressure on the electrode wire in the form of the pressure of the electrode carrying rolls and the temperature of the electrode wire at the welding spot, and the work point in the stress strain diagram is given by the electrode wire stress at the welding spot). Considering such a safety gap between the work point and the elastic limit, whereas previously the work point frequently was positioned only slightly below the elastic limit, an essential advantage is that when working with a sufficient safety gap between the work point and the elastic limit even with an eventual departure from the operating specifications and the resulting displacement of the work point upwardly and/or the downward displacement of the elastic limit as a result of changes in the values of the parameters of the stress-strain diagram it is nevertheless guaranteed that the work point will always remain below the elastic limit. Therefore only elastic deformation of the electrode wire occurs at the welding point. If the work point lies only slightly below the elastic limit, departure from the operating specifications under circumstances which displaces the work point upwardly over the elastic limit or the elastic limit downwardly below the work point can lead to undesired stretching of the wire at the welding point. This in turn has the result that at least one of the two electrode supporting rolls, or the electrode wire supported by the roll, does not exactly roll on the work piece to be welded but instead has a slip proportional to the wire stretch, and such slip leads, as is known, to injury to the welding quality which injury is greater the greater the slip or the greater the mentioned wire stretch. This is due to the fact that in the end phase of the welding of the individual welded points of the welded seam the upper surface of the workpiece is somewhat softened and the wire surface lying on this workpiece upper surface, despite the pressure of the electrode carrying roll, can be pushed somewhat in the direction of the welding seam and in being so pushed takes with it the softened work piece upper surface. Therefore, the larger this movement of the wire relative to the workpiece the larger the injury to the welding quality. By means of the safety gap between the work point and the elastic limit made possible by the subject method such injury to the welding quality can be avoided even in the case of departures from operating specifications, which in practice always appear, because with a work point lying safely below the elastic limit no wire stretching and therefore no slip results at the welding point. So with the mentioned safety gap even with departures from operating specifications in general an optimum welding quality is obtainable.

Advantageously, in the subject method the diameter reduction in the first forming stage is such that at least 60 percent, preferably more than 75 percent, of the strength difference—between the wire strength at the elastic limit after the second forming stage and the wire strength of annealed wire at the elastic limit—is due to the strength difference between the wire strength at the elastic limit after the first forming stage and the wire strength of annealed wire.

Advantageously, the diameter reduction in the first forming stage is also such that the predominant portion of the total increase of the wire strength at the elastic limit taking place in both forming stages is due to the first forming stage.

It is of further advantage to associate with the criterium of the strengthening in the two forming stages the criterium of the amount of total reduction of the wire cross section in both forming stages due to the diameter reduction in the first forming stage. In this sense, the diameter reduction in the first forming stage should be such that the predominant portion, preferably more than 75 percent, of the total reduction of the wire cross sectional area in the two forming stages is due to the first forming stage.

In the subject method the electrode wire should be so far flattened in the second forming stage that the percentage widening of the wire in this second forming stage is at least three times as large, preferably more than five times as large, as the percentage lengthening of the wire by the rolls in the second forming step.

Advantageously, the electrode wire in the subject invention is at least so far flattened that its width is larger, preferably about more than twenty-five percent larger, than the diameter of the wire drawn from the wire supply.

The previous optional apportionment rules for the apportionment of the diameter reduction in the first forming stage and the flattening of the electrode wire in the second forming stage generally have the advantage that the effect achievable with the subject method of a homogeneous strength distribution over the cross sectional surface of the flattened electrode wire and the higher wire strength which results therefrom, for a flattened electrode wire made in accordance with the subject invention in comparison to a flattened electrode wire made by directly flat rolling a soft round wire, is further improved by observance of each one of these optional rules.

In a preferred embodiment of the subject method at least a portion of the rolling means effective for rolling in the second forming stage is driven by means of a motor performing at least a portion of the work required by the rolling. This has essentially the advantage that the wire tension of the flattened electrode wire leaving the rolling means is freely selectable and therefore can be selected to optimally suit the requirements of the welding process, which would not be the case if there were no motor for driving the rolling means, since the rolling means in this case for performing the necessary work of the forming process would have to be driven through the flattened electrode wire and therefore the wire tension itself would be dependent on the performance of the forming work, which either in the case of a predetermined forming job would only seldom have the required wire tension to suit the welding process, or in the case of a predetermined wire tension for the welding process would lead to a limitation of the forming work capable of being transferred over the wire, and therefore in general an optimal degree of rolling in the second forming stage would not be obtainable.

With special advantage, in the previously mentioned preferred embodiment of the subject method the pulling force required for the wire drawing in the first forming stage can at least partially be created by the rolling means for rolling the wire in the second forming stage, additionally to a rolling pressure effective for the rolling, producing a pulling force in the direction of the advancement of the wire which is larger than the difference between the product of the cross sectional area leaving the first forming stage and the tension at the elastic limit of the wire drawn from the wire supply and the product of the cross sectional area and the wire tension directly after the second forming stage and smaller than the difference between the product of the cross sectional area and strength of the wire directly after the first forming stage and the product of the cross sectional area and the wire tension directly after the second forming stage. This type of generation of the required pulling force for the drawing in the first forming stage has the advantage, especially, that means serving exclusively to create the pulling force can be avoided. Preferably, one roll of the rolling means which applies the pulling force to the wire can have the wire trained over its circumference to achieve an increased transfer of force. The angle of wrap over which the wire is trained or wrapped along the roll can be conveniently sized so that the product of the angle of wrap and the coefficient of sliding friction between the involved roll and the wire is at least equal to the ratio, reduced by the value one, of the product of the wire tension and wire cross sectional area at the beginning of the wrap to the same product at the end of the wrap.

Advantageously, in the subject method the electrode wire on its path from the wire supply to the first electrode supporting roll, before its entry into a cold forming means, passes through a wire holdback device, preferably a wire brake, for creating a sufficient wire tension. The advantages achieved by this are first of all, an exact input of the wire drawn from the wire supply into the cold forming means and secondly, especially in the case of input into a drawing die, the possibility of substantially reducing wear of the die due to friction.

Preferably, the subject method includes only two cold forming steps in the form of one individual drawing step in the first forming stage and one individual rolling step in the second forming stage. The advantage of such limitation to only two cold forming steps lies in a corresponding low technical requirement. Above all with one individual drawing step for the first forming stage, all of the above mentioned possibilites in general exist, especially that of removing the need to provide a means exclusively for creating the pulling force required for the first forming stage and instead of this of using the rolling means of the second forming stage to also generate this pulling force.

In certain applications it can also be an advantage if the subject invention includes more than two cold forming steps, so that the cold forming in at least one of the two forming stages is performed in several steps. In this case, the first forming stage preferably includes several drawing steps, while the second forming stage preferably includes only a single rolling step. The possibility to have several drawing steps in the first forming stage comes especially into consideration if in the subject method one is starting with an annealed wire having a relatively large wire strength in comparison to the wire strength after the first forming stage, the reduction of which wire to the wire strength after the first forming stage is not possible in one drawing step. Here, it is possible within the scope of the subject method to shift the first drawing step, and possibly other drawings steps of the first forming stage, to the place where the electrode wire is manufactured, since the subject invention in principle is not dependent on where the individual steps of the cold forming of the electrode wire take place. As a further example, it is within the scope of the subject method, in the case the embodiment having only two cold forming steps to shift the drawing step to the factory where the electrode wire is made. As a rule however in the practice of the subject invention it is expedient that at least a part of the cold forming to which the electrode wire is subjected take place on the path of the electrode wire from the wire supply to the first electrode supporting roll because the wire drawn from the wire supply is preferably a round wire, which means that at least the flattening of the wire preferably takes place along its path from the wire supply to the first electrode supporting roll. The reason that the wire drawn from the wire supply is preferably a round wire is that with a wire electrode operated welding machine a large wire supply is necessary, and in the case of such a large wire supply, which has a considerable weight, the withdrawal of the wire from the supply should be so arranged that the wire supply itself remains at rest (the supply not for example including a rotatable spool which rotates as a result of the wire being drawn from it, which because of the large mass of the wire and the associated large rotational energy is difficult to control so that it is properly accelerated and braked in keeping with the wire consumption dictated by the starting and stopping of the welding machine). Also, in the case of a wire supply remaining at rest a 360 degree twist of the wire occurs upon the drawing off of each individual convolution from the wire supply. This is not of importance to the use of the wire if the wire is round, but a twisted flattened wire is not useable.

Preferably the subject method should start with an annealed wire. This has the advantage that normal commercial wire is such annealed wire, and therefore the cost of such annealed wire is as a rule the lowest. And since a modern high performance automated welding machine, working with wire electrodes and operating continuously, can consume a ton of copper wire each day, the wire cost naturally plays an entirely decisive roll. In this sense, therefore, the wire drawn from the wire supply is advantageously annealed round wire. In a purely technical respect it can on the other hand also be of advantage if the wire drawn from the wire supply is harder than annealed wire, because in this case the wire after the cold forming steps which take place on its way from the wire supply to the first electrode supporting roll as a rule has a higher strength at the elastic limit then achievable in the same cold forming steps with an annealed wire drawn from the wire supply, so the decision of whether the advantage of cost saving or the advantage of higher wire strength is to be sought depends on whether the larger wire strength is necessary or not. In any event the wire drawn from the wire supply should not be too hard because this can result in problems with guiding the wire from the wire supply to the welding machine and also to problems arising from the above mentioned twisting of the wire 3600 for each convolution drawn from the wire supply.

In the subject method copper wire preferably used as the electrode wire because this is best suited to the provided cold forming steps as well as to the welding method itself. In this regard a wire which comes into consideration is a first line copper with a purity of at least 99.4%, and preferably more than 99.8%.

The invention relates further to a resistance roll seam welding machine for carrying out the subject invention with a running electrode wire which first passes over a first and then over a second of two electrode supporting rolls pressable toward one another, and cold forming means for increasing the wire strength and reducing the wire cross sectional area as well as for converting the wire cross sectional shape from an essentially round shape to a flat shape before the entry of the electrode wire onto the first electrode supporting roll, which cold forming means is characterized by rolling means with rolls driven by a motor for cold forming in the second forming stage. The rolling means can conveniently include a pair of rolls as well as a drive means for both the rolls, and the drive means can include a motor and a control means for controlling the rotation, as well power transmitting means between the motor and the two rolls with a reversing drive in the power path between one of the two rolls and the motor. For achieving a predetermined wire tension of the electrode wire after leaving the rolling means the welding machine can further advantageously include a wire tension device with means for creating the wire tension, means for measuring the difference between the desired wire tension and the instantaneous wire tension and means for transmitting the difference as a control signal to the control means for controlling the rotation of the motor to accomplish such a regulation of the motor rotation and therewith the rotation of the rolls that the difference signal is kept negligibly small and therefore the wire tension almost constant.

The welding machine for carrying out the subject invention is further expediently provided with a drawing apparatus with at least one drawing die for cold forming in the first forming stage. Further, wire guide means can advantageously be provided for so guiding the wire to the rolling means that one of the rolls driven by the motor is a wrapped over a portion of its circumference by the electrode wire so as to transfer to the wire at least a portion of the necessary pulling force for the drawing in the first forming stage. A wire brake is also further advantageously provided in the area between the wire supply and the cold forming means to exactly introduce the electrode wire into the cold forming means as well as to minimize the eventual wear of the drawing die. Moreover a pointing device can advantageously be combined with the welding machine to point the electrode wire for threading into the drawing die. To store the wire supply a wire store can be further advantageously be provided, preferably in the form of a pot-shaped container with an annular hollow space serving to store the wire or in the form of an upright spool combined with a rotatable bracket as the draw-off means.

The invention moreover relates to an application of the subject invention to resistance roll compression seam welding. The subject invention is especially suited and advantageous for application to the field of compression seam welding because with this method, as already mentioned, a considerably larger wire strength of the electrode wire at the elastic limit can be obtained and thereby essential improvements in the welding are achievable such as for example a smooth compression seam and moreover simplification of the mechanical apparatus and machine control.

The invention is explained in more detail in connection with the accompanying figures showing several embodiments of the invention. The drawings are:

FIG. 1 is a side view illustrating the rolling process for rolling a wire by means of a pair of rolls shown only in partial side view.

FIGS. 1A to 1D are cross sectional views taken respectively on the lines A—A, B—B, C—C and D—D of FIG. 1.

Figure 2:
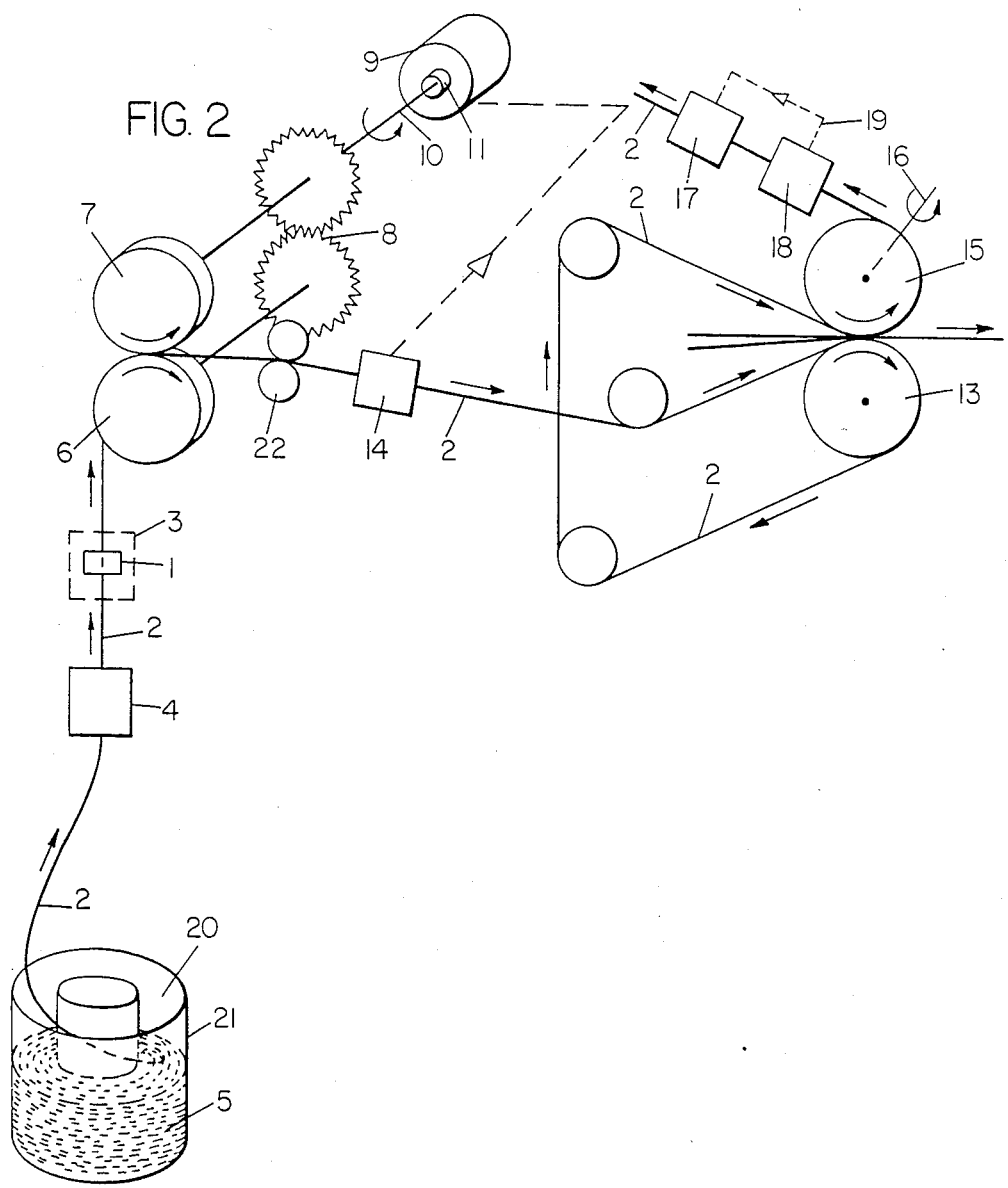

FIG. 2 is a schematic illustration showing the principle construction of an embodiment of a device for carrying out the subject invention, with one drawing die as the cold forming means in the first forming stage and a pair of rolls driven by a motor as the cold forming means of the second forming stage, as well as with a pot-shaped container having an annular space serving as a storage means for the wire supply.

FIG. 3 is a schematic illustration of an upright spool as the storage means for the wire supply with an associated rotatable bracket as the means for withdrawing the wire form the spool.

FIGS. 4A-4C are schematic illustrations showing the states of the electrode wire in the case of the subject method before the first forming stage (FIG. 4A), between the first and second forming stages (FIG. 4B) and after the second forming stage (FIG. 4C), the thickness of the cross hatching symbolizing the degree of strengthening in the involved cross section or cross sectional area.

In FIG. 1, as well as in FIGS. 1A to 1D, the rolling of a soft round wire is schematically illustrated in several phases of the rolling process. To begin with the still soft round wire enters at the plane A—A into the rolling arrangement made of the illustrated roll pair shown in side view in FIG. 1. At this entry point the wire is still circular as illustrated in FIG. 1A taken on the line A—A of FIG. 1. With further advancement into the rolling apparatus the wire is compressed so that it first of all takes on an essentially elliptical cross sectional form illustrated in FIG. 1B taken on the line B—B of FIG. 1. Then it is converted to succesively more and more flattened cross sectional shapes as illustrated in FIGS. 1C and 1D taken on the planes C—C and D—D of FIG. 1. With the compression and the associated cold forming the wire is strengthened by the rolling process, so that it will have areas of different strength over the cross sectional area of the wire, as indicated in FIGS. 1B to 1D by the different densities of cross hatching. A density of crosshatching symbolizes an average degree of strength in the involved area, however it is to be noticed that there is naturally no jump change of the degree of strength at the boundaries of the areas but instead a continuous transition. The illustrated boundaries of the areas of different strength represent only somewhat the points, at which a transition from an area of high strength to an area of lower strength tends to fall off in a heavy way. The different strengthening in the different areas may be associated with the different average pressures exerted in the involved areas on the crystal grains microscopically making up the wire, because the strengthening rests in principle on the transformation of coarse crystal grains into fine ones, and one of the operative factors for such a conversion is the pressure applied to the crystal grains. The different pressures in the different areas results from the fact that the width of the support surface with which the wire engages the roll surface in a given cross sectional plane, as for example one of the ones shown by FIGS. 1B to 1D, in each case, is smaller than the width of the wire cross section in the cross sectional plane in question. If one were in the area of the cross sectional plane in question, that is, for example, in the area of the cross sectional plane shown in FIG. 1D, to cut out a thin slice of the wire of a thickness $\Delta x$, then there would be along the edge of the slice two support surfaces, of width b and accordingly of area $b.\Delta x$ opposite to one another with which the wire engages the roll surfaces and onto which the roll surfaces press with a pressure p to produce a force on the area of $p.b.\Delta x$. These two forces of equal size directed oppositely toward one another would at the point lying in the middle between the two support surfaces, at which the wire cross section has a larger width $b_m$ produce a pressure of a value:

$$p_m = \frac{\text{force}}{\text{area}} = \frac{p.b.\Delta x}{b_m \cdot \Delta x} = p \cdot \frac{b}{b_m}$$

which is smaller than the applied pressure p by the ratio of b to $b_m$. Accordingly, the pressure inside the wire in each cross sectional plane between the planes A—A and D—D in FIG. 1 must diminish from the surfaces of the wire engaged by the roll faces toward the middle of the wire cross section because the width b of the support surfaces, as already explained, in each case is smaller than the width $b_m$ of the wire cross section in the middle between the two support surfaces, and if one proceeds on the given assumption that for a conversion of coarse crystal grains into fine ones, which brings with it a strengthening of the wire, a certain average minimum pressure is required, then the borders between the mentioned areas of different strengthening result, which borders are lines or surfaces of equal potential along which such average minimum pressure prevails. In the areas with the small spacing between the hatch lines in FIGS. 1B-1D, the pressure is greater than the mentioned minimum pressure, so that there a high material strengthening occurs, whereas in the areas with larger spacing of the hatch lines in FIGS. 1B-1D, the pressure is under the mentioned minimum pressure, and therefore, a lower material strengthening occurs. In spite of the fact that in the areas with large spacing of the hatch lines the pressure is below the mentioned minimum pressure, some material strengthening does occur due to the fact that the pressure at a given point corresponds only to the average value of the pressure effective on the plurality of crystal grains at this place, so that therefore naturally the pressure effective on the individual crystal grains departs with a statistical distribution above and below this average value (just as gas pressure results from the average value of the speed of the individual gas molecules and the individual speeds of the molecules depart both upwardly and downwardly from this average value). Therefore, in the areas with a pressure below the mentioned minimum pressure, the pressure applied to some portion of the crystal grains is above the minimum pressure, and this portion is smaller the further the pressure lies under the mentioned minimum pressure.

The sections taken through FIG. 1 on the planes B—B, C—C, and D—D represented in FIGS. 1B, 1C, and 1D, show that at the beginning, at FIG. 1B, the width ratio $b/b_m$ and correspondingly the pressure ratio $p_m/p$ is still relatively small, about 0.3, and the corresponding areas of high material strength are limited to the areas directly adjacent the support surfaces of the wire engaging the roll faces. However, with further advancement of the wire into the rolling apparatus, the ratio $b/b_m$ and $p_m/p$ increases successively to, for example, about 0.5 in FIG. 1C and, for example, about 0.7 in FIG. 1D, and the associated areas of high material strength spread toward the middle of the wire. A soft round wire provided as the electrode wire can therefore only be rolled until the areas of high material strength meet one another at the middle of the wire as in FIG. 1D, since upon further rolling, structural flaws will have to be reckoned with, because in the areas where no further material strengthening can take place (similar to the case of a tensile test at the necking point), upon further deformation, a break occurs. FIG. 1D therefore represents about the end condition to which a soft round wire dare be rolled, and as remains evident in FIG. 1D, at this end condition, a relatively large portion of the total wire cross section is not included in the area of material strengthening, so that the strength of the rolled wire achieved by the rolling apparatus of FIG. 1 remains somewhat below the strength which would result if the high material strength were to extend over the whole wire cross section. The main purpose of the present invention is therefore to increase the portion of the wire cross section over which the high material strengthening extends and thereby to achieve welding advantages obtainable with such an increase in the wire strength.

This purpose is served by the apparatus as shown schematically in FIG. 2 for carrying out the present invention. With reference to FIG. 2, it should first of all be noted that in the illustrated construction only those parts necessary for carrying out and explaining the present invention are represented on one hand, and, on the other hand, by way of general illustration parts of a suitable welding machine needed for carrying out the present method are also shown, for the most part in symbolic form. Only symbolically indicated in the illustrated embodiment are, for example, a drawing apparatus 3 including a drawing die 1, for drawing the electrode wire 2, and therefore for cold forming the wire in the first forming step, a wire brake 4 for the drawing apparatus 3, a rolling apparatus 6–11 for rolling the electrode wire 2, and therefore for cold forming it in the second forming stage, which rolling apparatus includes a pair of rolls 6, 7 as well as a reversing drive 8, a motor 9 and a control means for controlling the rotation of the drive shaft of a drive device 11. A wire tension device 14 serves to achieve a predetermined wire tension in the electrode wire 2 upon its entry into the first electrode carrying roll 13 (which wire tension device as a rule includes a reversing roll for the electrode wire loaded with a force and means for measuring the wire length between this reversing roll and the pair of rolls 6, 7 or for measuring the displacement between the instantaneous position of this reversing roll and a predetermined desired position of the reversing roll corresponding to a definite wire length between the reversing roll and the roll pair, as well as means for converting the measured displacement between the desired and instantaneous positions of the reversing roll into a signal to the control means 11 of the drive apparatus to obtain such a regulation of the rotation of the shaft 10 and therewith of the pair of rolls 6 and 7 that the wire length between the pair of rolls 6 and 7 and the reversing roll essentially remains constant or the aforementioned signal is zero). The drive for the second electrode carrying roll 15 is applied through a rotatable drive shaft 6. A wire advancement device 17, with a means for stepwise or steadily changing the advancement speed pulls the electrode wire 2 from the second electrode carrying roll 15 and for further conducting it into a wire cutter (which wire advancement device for example can be made up of a stepped disk driven at a constant rotational speed with a plurality of annular guide surfaces finely graduated in diameter for the electrode wire or according to the present case by an advancing disk on the shaft 10 of the drive apparatus 11). A wire tension apparatus 18 is located on the output side (which in the case of a construction where the wire advancing apparatus 17 is associated with the drive apparatus 11 can be made like the wire tension apparatus 14 and, through the transmission path 19, used to control the advancement speed of the wire advancing device 17 so that in the withdrawal of the electrode wire 2 from the second electrode carrying roll 15 a certain constant wire tension is maintained, or which wire advancement device in the case of of the wire advancing device 17 being a driven stepped disk, can be made, for example, from a spring loaded roll over which the electrode wire 2 runs and whose spring tensions the wire, whereby a spring tension size is indicated and the advancement speed of the wire advancing device 17 is then adjusted on the basis of this indication by hand, or the spring loaded roll cooperates with the stepped disk of the wire advancing device so that the electrode wire with a reduction in spring tension of the spring-loaded roll is automatically shifted to the next higher advancement speed step of the annular guide surface and with an increase in spring tension of the spring loaded roll is automatically transferred to the next lower advancement speed step of the associated annular guide surface). All of these parts which are indicated only symbolically in the schematically illustrated welding machine of FIG. 2 with the exception of the drawing device 3 are parts of the known welding machine by means of which the previously mentioned known methods of CH-PS No. 536163 and DE-PS No. 2126497 can be carried out, and therefore require no further detailed explanation.

In carrying out the present method, in the welding machine according to FIG. 2 a soft copper wire 2 is pulled from the annular storage space 20 of the pot shaped container 21 serving as the wire store, the wire having an essentially circular cross section with a cross sectional surface of 1.496 mm$^2$ and a diameter of 1.38 mm as well as a wire strength $\sigma_E$ at the elastic limit of between 8.5 kg/mm$^2$ and 12.5 kg/mm$^2$.

The wire 2 drawn from the wire supply 5 first of all runs through the wire brake 4 provided for the exact introduction of the wire 2 into the drawing device 3. From the wire brake 4 the wire 2 runs under tension along the axis of the drawing die 1, located inside the drawing apparatus 3, to the drawing die 1. The tension in the wire 2 as it runs from the wire brake 4 to the drawing die 1 serves principally to exactly introduce the wire 2 into the drawing die and can therefore be relatively small. It can however by strong gripping of the wire brake be made so high that it results in the additional advantage of a noticeable reduction in the wear of the drawing die 1 or a corresponding increase in the life of the die. A higher tension in the wire running from the wire brake 4 to the drawing die 1 can also advantageously serve to make possible a diameter reduction in the drawing die 1 which is somewhat smaller than the one usually coming into consideration, which is in the order of magnitude of 10% of the diameter reduction in the drawing die, but above all to avoid wire tension this pre-tension should also should not be chosen to high. As a rule the tension of the wire 2 originating from the wire brake 4 is kept low to make possible the largest diameter reduction in the drawing die 4 since in the present invention the highest possible portion of the total deformation by means of drawing is strived for, because with the drawing a uniform deformation and strengthening is obtained.

As a result of passing through the drawing die 1 the wire from the brake 2 is reduced from its original diameter of 1.38 mm to a diameter of 1.2 mm. That corresponds to a cross section reduction of 75.6% of the original wire cross section and therefore—since the volume of the wire material remains constant—a lengthening of the wire by a factor of 1.3225 or about 32.25% takes place. The wire strength at the elastic limit is increased by this drawing process from the mentioned 8.5 to 12.5 kg/mm$^2$ to 28 to 33 kg/mm$^2$. The change of wire cross section in the drawing process in the die 1 as well as the resulting wire strengthening is schematically illustrated in FIGS. 4A and 4B. FIG. 4A shows the wire cross section of the wire entering the drawing die 1 and FIG. 4B the wire cross section of the same departing wire 2, and the density of the hatching in FIG. 4A and 4B symbolizes the wire strength before and after the drawing die 1. A comparison of FIGS. 1A and 1D, which show the same wire before and after a direct flat rolling, makes it clear that the wire strength symbolized by the density of the hatching after the drawing process is already higher than after the direct flat rolling, because the wire cross section in FIG. 1D still contains areas of low material strength, whereas the wire cross section in FIG. 4B exhibits a uniformly high material strength over the entire cross section.

The drawing die 1 consists essentially of a diamond die stone with a rotationally symmetric die opening for a diameter reduction from 1.38 mm to 1.2 mm and is water cooled by means of a non-illustrated cooling device for the removal of the heat generated in the forming process. By means of the cooling and the use of a diamond die stone the wear of the die 1 can be kept relatively low.

The motor 9 delivers the energy necessary for drawing the wire 2 through the die 1 over the reversing drive 8 and the roll 6 which along with its rolling function also has the function of an advancing roll for generating the pulling force necessary for the drawing. Therefore in order that a sufficient pulling force is transferred to the wire 2, the wire wraps over the roll 6, as seen in FIG. 2, over a wrap angle of about 90'. It is to be observed in the measurement of this wrap angle that the tangential speed of the rolls 6 and 7 is equal to the wire speed of the electrode wire 2 leaving the pair of rolls 6 and 7 and that this wire speed because of the further cross sectional reduction of the wire 2 resulting from the rolling, and the consequent wire lengthening, is larger than the speed of the wire 2 entering the pair of rolls 6 and 7, so that therefore in the area of the mentioned wrap between the roll 6 and the advanced wire 2 a percentage slip occurs corresponding to the wire lengthening in the pair of rolls 6 and 7, and accordingly the force transfer from the roll 6 to the advanced wire 2 results not from static friction but from sliding friction.

The wire 2 advanced by the roll 6 then passes through the pair of rolls 6 and 7 and is flat rolled by these so that a flat wire is produced having the cross sectional shape shown in FIG. 4C with a width of 1.84 mm and a height of 0.585 mm and a cross sectional area of 1.054 mm$^2$. Since the wire 2 after leaving the drawing die 1 has a diameter of 1.2 mm and accordingly a cross sectional surface of 1.131 mm$^2$ a further cross section reduction to 93.2% of the wire cross section after the drawing occurs in the pair of rolls 6, 7, and therefore total cross section reduction is of 70.5% of the original wire cross section, which on the basis of the wire volume remaining constant corresponds to a lengthening of the wire by a factor of 1.4191 or about 41.91%. The wire strength at the elastic limit is increased with this rolling process again from the mentioned 28 to 33 kg/mm$^2$ to 33.5 to 38.5 kg/mm$^2$. With this flat rolling of the wire 2 in the pair of rolls 6, 7 there naturally occurs the effect explained above in connection with FIG. 1 and FIGS. 1A to 1D the principle result of which is indicated in FIG. 4C by the two lateral edge areas with a cross hatching of somewhat equal density as in FIG. 4B, yet this effect here has only a very low influence because the wire already before the rolling process at all points of its cross sectional surface has a high material strength and the mentioned lateral edge areas therefore do not cause any essential reduction of the average strength over the whole cross section shown in FIG. 4C with respect to the wire strength in the central area of the cross section shown in FIG. 4C.

From the above mentioned wire lengthening of about 42% there results, in comparison to the know method of CH-PS No. 536163 where there is a wire lengthening of only about 18%, a material saving with respect to the method of CH-PS No. 536163 in the ratio of 1.18:1.42=0.83, therefore around 17%, which because of the already metioned considerable copper consumption of modern high production welding machines brings about an accompanying considerable cost saving.

The flat wire leaving the pair of rolls 6, 7 with the cross sectional shape shown in FIG. 4C can subsequently be passed through a roll pair 22 serving to calibrate the wire and there as to its width can be calibrated to the width of the non-illustrated guide grooves in the electrode carrying rolls 13 and 15. In this calibration the two small sides of the flat wire illustrated in cross section in FIG. 4C are somewhat flatened. Because of the high hardness of the wire it must however be taken care that too heavy a calibration is not undertaken, because if it is the danger of bending the flat sides of the wire exists.

Finally the electrode wire 2 passes through the wire tensioning apparatus 14 by means of which in a known manner, in cooperation with the rolling apparatus 6 to 11, a predetermined wire tension is created in the wire and is continually maintained. The rolling apparatus has therefore the effect of a means for holding back the wire, and the wire tension is in principle created by a type of spring loaded reversing roll for the electrode wire 2, by means of the changeable position of which the roll speed of the rolling device is so regulated that the wire length between the pair of rolls and the reversing roll in essence remains constant. If the mentioned predetermined wire tension exceeds the value most favorable for the wire tension at the output of the rolling apparatus, another wire brake can be included between the rolls 6, 7 and the wire tensioning device 14 through which brake the electrode wire 2 is made to pass and by means of which the wire tension on the side of the pair of rolls 6,7 is reduced.

After leaving the wire tension apparatus 14 the electrode wire is guided to the first electrode carrying roll 13. It is recommended that the electrode wire be guided into the guide groove of the electrode carrying roll in the way shown in FIG. 2 so that the wire before reaching the welding position does not lay on or lays only lightly on the base of the guide groove, because then the wire stretching which eventually takes place at the welding position can be drawn out rearwardly from the welding position by means of the wire tension, without at the same time transferring a superimposed rearward motion to the electrode carrying roll 13, so that one in this way can easily achieve an entirely similar circumferential speed of the two electrode carrying rolls.

At the welding position the electrode wire 2 heats substantially less than a directly flat roll wire because of its essentially smaller thickness in comparison to a directly flat rolled wire and the corresponding lower ohmic resistance to the conduction of welding current, and because of this lower heating there results, additionally to the enlargement of the safety gap between the work point and the elastic limit in the stress-strain diagram of the electrode wire achieved by the increase of the wire strength at the elastic limit, a further enlargement of this safety gap and therewith from the above mentioned grounds a further increase in the operating safety or a still more uncritical adjustment of the operating data.

After leaving the first electrode carrying roll 15 the electrode wire 2 is guided to the second electrode carrying roll 15 where it likewise is heated at the welding position essentially less than a directly flat rolled wire, and after leaving the same the electrode wire 2 passes through, in a customary manner, the wire tension device 18 and the wire advancing device 17 whose construction and function have been explained above. Thereafter the electrode wire 2 is guided to a non-illustrated wire chopper.

As mentioned above, the results of the present invention do not depend on where the individual steps of the cold forming of the electrode wire take place, so that within the scope of the present method it is also possible for the drawing step or steps to take place where the electrode wire is manufactured. Above all, then the electrode wire has to be handled by the manufacturer and the user in a hard condition, which in the above embodiment means a wire strength at the elastic limit of about 30 kg/mm$^2$, and therefore certain problems arise because for example the insertion of a hard wire into a pot-shaped container such as the container 21 of the FIG. 2 is possible only with considerable difficulty. The withdrawal of a hard wire from such a container is also not without problems, because a hard wire withdrawn from such a container has the tendency to maintain its wound shape and therefore in the introduction of the wire into the welding machine difficulties are encountered. In such a case, when the drawing step or steps of the subject invention are carried out at the place where the wire is manufactured, it is recommended that a spool such as the spool 23 of FIG. 3 be used for storing the wire because with such a spool hard wire from the manufacturer can be wound without difficulty and the withdrawal of the hard wire can be accomplished using a rotatable bracket. In FIG. 3 the rotatable bracket consists of a possibly weakly bent tube 24 through which the wire 2 to be withdrawn is pulled and which at its outlet 25 is fastened to a tubular shaft 26 rotatably supported for rotation about the axis of the spool 23. If the wire is pulled through the tube 24 the tube 24 rotates in the direction 27 about the axis of the spool 23, and a trumpet shaped inlet 28 then moves about the wire supply 5 formed by the winding on the spool and thereby unwinds the wire from the spool 23, the unwound wire being taken up by the mouth of the trumpet shaped inlet 28 of the tube 24. To avoid friction loss and wear inside the tube 24 small rolls, not illustrated, can be arranged in the wall of the tube 24 so that the wire does not rub against the tube wall but instead is guided over the small rolls. In this way a simple withdrawal of the hard wire from the spool 23 is possible without the hard wire—as would be the case if it were guided over reversing rolls—having to be heavily bent. The use of a wire store with a rotatable withdrawal apparatus as in FIG. 3 therefore makes possible a simple handling of hard wire for the manufacturer of the electrode wire as well as for the user of the present invention and thereby permits the transfer of the drawing step or steps of the first forming stage of the present invention or a part of these drawing step or steps to the place at which the electrode wire is manufactured.

It should finally be noted that the term "annealed wire" here defines a wire with the strength of an annealed wire (therefore for example annealed copper wire with a wire trength of 8.5 kg/mm$^2$ at the elastic limit) and it does not necessarily imply the concrete step of annealing.

We claim:

1. A method for electrically resistance roll seam welding which method comprises: providing only one electrode wire which is drawn from a wire supply and which moves into a resistance roll seam welding machine first over a first and then over a second of two electrode carrying rolls pressable against one another, and then welding workpieces fed between said electrode carrying rolls, the strength of which wire for the purpose of preventing the formation of wire loops between the two electrode carrying rolls before its entry into the first electrode carrying roll being increased by cold forming and its wire cross section before its entry into the first electrode carrying roll being reduced in cross sectional area and being transformed from an essentially circular shape to a flat cross sectional shape with a width greater than the diameter of the round wire and a height less than the diameter of the round wire, characterized in that the cold forming is carried out in several steps such that before the entry of the wire into the first electrode carrying roll the wire is cold formed in a first forming stage by drawing and thereafter is cold formed in a second forming stage by rolling and that the electrode wire in the first forming stage is uniformly deformed over its entire cross section and whereby an essentially circular cross sectional shape is maintained during the cold forming in the first forming stage and in this first forming stage only the wire diameter is reduced and that this reduction in diameter is such that the predominant portion of the strength difference between the wire strength at the elastic limit after the second forming stage and the wire strength of annealed wire at the elastic limit is due to the strength difference between the wire strength at the elastic limit after the first forming stage and the wire strength of annealed wire at the elastic limit, and so that in the first forming stage an essentially uniform deformation of the electrode wire over the entire cross section occurs, and the cross sectional shape of the electrode wire is first transformed to the said flat cross sectional shape in said second forming stage and the electrode wire thereby being at least so far flattened that the widening of the electrode wire resulting from the flattening in the second forming stage is percentage-wise larger than the percentage lengthening of the electrode wire resulting from the rolling in the second forming stage.

2. The method according to claim 1 further characterized in that the diameter reduction in the first forming stage is so sized that at least 60%, preferably more than 75%, of the strength difference between the wire strength at the elastic limit after the second forming stage and the wire strength of annealed wire at the elastic limit is due to the strength difference between the wire strength at the elastic limit after the first forming stage and the wire strength of annealed wire at the elastic limit.

3. The method according to claim 1 further characterized in that the diameter reduction in the first forming stage is so sized that the major portion of the total increase in wire strength at the elastic limit resulting from the two forming stages is due to the first forming stage.

4. The method according to claim 1 further characterized in that the diameter reduction in the first forming stage is so sized that the major portion, preferably more than 75%, of the total reduction of the cross sectional area of the wire cross section achieved in the two forming stages is due to the first forming stage.

5. The method according to claim 1 further characterized in that the electrode wire is so far flattened in the second forming stage that the percentage of the widening of the electrode wire resulting from this flattening in the second forming stage is at least three times as large, preferably more that five times as large, as the percentage lengthening of the electrode wire resulting from the rolling in the second forming stage.

6. The method according to claim 1 further characterized in that the electrode wire is at least so far flattened in the second forming stage that its width is larger, preferably about more than 25% larger, than the diameter of the wire drawn from the wire supply.

7. The method according to claim 1 further characterized in that said rolling in the second forming stage is carried out by a rolling means at least a portion of which is driven by a motor performing at least a part of the work required for the rolling.

8. The method according to claim 7 further characterized in that the drawing in the first forming stage includes the application of a pulling force to the wire at least a part of which pulling force is created by the fact that the roll means effective for the rolling in the first forming stage additionally to producing a rolling pressure on the wire for the rolling produces a pulling force on the wire, which is larger than the difference between the product of the wire cross section proceeding out of the first forming stage multiplied by the tension at the elastic limit of the wire drawn from the wire supply and the product of the wire cross section multiplied by the wire tension directly after the second forming stage and which is smaller than the difference between the product of the wire cross section multiplied by the tensile strength of the wire directly after the first forming stage and the product of the wire cross section multiplied by the wire tension directly after the second forming stage.

9. The method according to claim 8 further characterized in the rolling means including a roll which exerts the said pulling force on the wire and which for the purpose of sufficient force transfer to the wire has the wire wrapped over a portion of its circumference.

10. The method according to claim 9 further characterized in that the wrap angle over which the wire wraps around the said roll is so sized that the product of the circularly measured wrap angle multiplied by the coefficient of sliding friction between the said roll and the wire wrapped therearound is at least equal to the ratio of the product of the wire tension multiplied by wire cross section before the start of the wrap to the same product after the end of the wrap diminished by one.

11. The method according to claim 1 further characterized in that the electrode wire on its way from the wire supply to the first electrode carrying roll before its entry into the first cold forming means passes through an apparatus, preferably a wire brake, for holding back the wire passing therethrough to create a sufficient wire tension.

12. The method according to claim 1 further characterized in that it includes only two cold forming steps in the form of one drawing step in the first forming stage one rolling step in the second forming stage.

13. The method according to claim 1 further characterized in that it includes more than two cold forming steps so that the cold forming in at least one of the two forming stages takes place in several steps.

14. The method according to claim 13 further characterized in that the first forming stage includes several drawing steps.

15. The method according to claim 14 further characterized in that the second forming stage includes only one single rolling step.

16. The method according to claim 1 further characterized in that at least a portion of the cold forming step, to which the electrode wire is subjected, is performed as the electrode wire moves from the wire supply to the first electrode carrying roll.

17. The method according to claim 1 further characterized in that the method starts with annealed wire.

18. The method according to claim 17 further characterized in that the wire drawn from the wire supply is soft round wire.

19. The method according to claim 1, further characterized in that copper wire is used as the electrode wire.

20. The method according to claim 1 used in resistance roll compression seam welding.

21. A resistance roll seam welding machine comprising first and second electrode carrying rolls pressable toward one another and over which rolls an electrode wire runs in sequence as the electrodes, and cold forming means for increasing the wire strength and reducing the wire cross sectional surface as well as for converting the wire cross sectional shape from an essentially round one into a flat cross sectional shape before the entry of the electrode wire onto the first electrode carrying rolls, characterized by rolling means (6, 7, 8, 9, 10, 11) with rolls (6, 7) driven by a motor (9) for cold forming in the second forming stage.

22. A welding machine according to claim 21, further characterized in that the rolling means includes a pair of rolls (6,7) as well as a drive means (8, 9, 11, 11) for both rolls (6, 7) and in that the said drive means includes a motor (9) and a control means for controlling the rotation of the same as well as force transmitting means (10) between the motor (9) and the two rolls (6, 7) with a reversing drive (8) positioned in a force path between one (6) of the two rolls and the motor (9).

23. A welding machine according to claim 22 further characterized in that for achieving a predetermined wire tension of the electrode wire (2) after leaving the rolling means (6, 7, 8, 9, 10, 11) a wire tension device (14) is provided with means for creating the wire tension, means for producing a control signal representing the difference between the instantaneous value and a set value of the wire tension and for transmitting said control signal to the control means for controlling the rotation of the motor (9) for the purpose of such a regulation of the motor rotation and thereby the rotation of the rolls (6, 7), that the difference is insignificantly small and thus the wire tension nearly constant.

24. A welding machine according to claim 21 characterized by a drawing device with at least one drawing die (1) for cold forming in the first forming stage.

25. A welding machine according to claim 24 characterized by said drawing device requiring the application of a pulling force to said wire to pull said wire through said drawing device, and by one (6) of the rolls (6, 7) driven by the motor (9) having the electrode wire (2) wrapped around a portion of its circumference so that at least a portion of the pulling force required for the drawing in the first forming stage is transferred by said one roll to the wire.

26. A welding machine according to claim 21 characterized by a wire brake (4) in the area between the wire supply (5) and the cold forming means (1).

27. A welding machine according to claim 21 characterized by a wire store for storing the wire supply (5) in the form of a pot shaped container with an annular hollow space serving for the wire store.

28. A welding machine according to claim 21 characterized by a wire for storing the wire supply (5) in the form of a stationary upright spool (230) on which said wire is wound and a rotatable bracket (24, 25, 26) or use in withdrawing said wire from said spool.

* * * * *